(12) United States Patent
Sullivan et al.

(10) Patent No.: US 7,025,696 B2
(45) Date of Patent: *Apr. 11, 2006

(54) GOLF BALL CONTAINING GRAPHITE NANOSHEETS IN A POLYMERIC NETWORK

(75) Inventors: Michael J. Sullivan, Barrington, RI (US); Derek A. Ladd, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/789,252

(22) Filed: Feb. 27, 2004

(65) Prior Publication Data

US 2004/0166962 A1 Aug. 26, 2004

Related U.S. Application Data

(63) Continuation of application No. 10/157,521, filed on May 29, 2002, now Pat. No. 6,802,784.

(51) Int. Cl.
*A63B 37/06* (2006.01)

(52) U.S. Cl. ...................... 473/374; 473/373

(58) Field of Classification Search ........ 473/351, 473/367–378
See application file for complete search history.

(56) References Cited

U.S. PATENT DOCUMENTS

| | | | |
|---|---|---|---|
| 3,404,031 A | 10/1968 | Clayton et al. | 117/201 |
| 3,409,563 A | 11/1968 | Olstowski et al. | 252/506 |
| 3,560,155 A | 2/1971 | Olstowski et al. | 23/209.2 |
| 3,625,896 A | 12/1971 | Kirk et al. | 252/62 |
| 4,091,083 A | 5/1978 | Hirschvogel et al. | 423/415 |
| 4,888,242 A | 12/1989 | Matsuo et al. | 428/408 |
| 4,895,713 A | 1/1990 | Greinke et al. | 423/448 |
| 4,961,988 A | 10/1990 | Zhu | 428/229 |
| 5,186,919 A | 2/1993 | Bunnell | 423/448 |
| 5,330,680 A | 7/1994 | Sakawaki et al. | 252/309 |

(Continued)

FOREIGN PATENT DOCUMENTS

WO    WO 02/09823 A1    2/2002

OTHER PUBLICATIONS

Guo-Hua Chen, Da-Jun Wu, Wen-Gui Weng, and Wen-Li Yan; Dispersion of Graphite Nanosheets in a Polymer Matrix and the Conducting Property of the Nanocomposites; Polymer Engineering and Science, Dec. 2001, vol. 41, No. 12; pp. 2148, 2149, 2150, 2151, 2152, 2153, and 2154.

*Primary Examiner*—Raeann Gorden
(74) *Attorney, Agent, or Firm*—Kristin D. Wheeler

(57) ABSTRACT

A golf ball containing a layer, which comprises nanosheets of exfoliated graphite dispersed in a polymeric matrix, is provided. Intercalated graphite is exfoliated by brief exposure to high heat to expand the thickness of the graphite. The expanded or exfoliated graphite is then mixed with monomers and polymerized in situ to form a polymer with a network of nanosheets of the exfoliated graphite dispersed therein. The exfoliated graphite advantageously retains its nanostructure during the polymerization process.

16 Claims, 1 Drawing Sheet

U.S. PATENT DOCUMENTS

| | | | |
|---|---|---|---|
| 5,846,459 A | 12/1998 | Mercuri | 264/42 |
| 5,863,467 A | 1/1999 | Mariner et al. | 252/511 |
| 6,136,386 A | 10/2000 | Nakahigashi et al. | 427/536 |
| 6,287,694 B1 | 9/2001 | Zaleski et al. | 428/402 |
| 6,299,550 B1 | 10/2001 | Molitor et al. | 473/354 |
| 6,309,314 B1 | 10/2001 | Sullivan et al. | 473/378 |
| 6,315,681 B1 | 11/2001 | Sullivan | 473/373 |
| 6,315,684 B1 | 11/2001 | Binette et al. | 473/377 |
| 6,325,730 B1 | 12/2001 | Binette et al. | 473/377 |
| 6,561,928 B1 * | 5/2003 | Binette et al. | 473/374 |
| 6,794,447 B1 | 9/2004 | Kim et al. | |
| 6,802,784 B1 * | 10/2004 | Sullivan et al. | 473/352 |
| 2003/0036597 A1 | 2/2003 | Ide et al. | 524/495 |
| 2003/0130061 A1 | 7/2003 | Rajagopalan et al. | 473/354 |
| 2004/0092336 A1 | 5/2004 | Kim et al. | |

* cited by examiner

US 7,025,696 B2

GOLF BALL CONTAINING GRAPHITE NANOSHEETS IN A POLYMERIC NETWORK

STATEMENT OF RELATED APPLICATION

This application is a continuation of application No. 10/157,521, filed on May 29, 2002 now U.S. Pat. No. 6,802,784.

FIELD OF THE INVENTION

The present invention relates to a golf ball including a layer containing fillers and more particularly to a golf ball with a layer containing exfoliated graphite nanosheets.

BACKGROUND OF THE INVENTION

Conventional golf balls typically comprise two functional components: a core and a cover. The primary purpose of the core is to be the "spring" of the ball or the principal source of resiliency. The cover protects the core and provides feel and greenside performance.

Two-piece solid balls are typically made with a solid core, usually made of a cross-linked polybutadiene or other rubbers, encased by a hard cover material. The core and/or the cover may also comprise multiple layers.

In an effort to make golf balls with improved performance characteristics, manufacturers have added fillers in various layers of the multi-piece golf balls. Fillers are typically added to adjust the density, rotational moment of inertia, flex modulus, mold release, or the melt flow index of one or more layers. For example, adding fillers to thermoplastic layers increases the flexural modulus or stiffness of such layers, so that the golf balls may achieve lower spin rates and greater distances.

Fillers used in the golf ball art typically include fibers, inorganic powders, carbonates, metal and metal alloys, metal oxides, metal stearates, particulate carbonaceous materials and micro balloons. Fibers typically include glass fibers, aramid fibers and asbestos. Inorganic materials typically include silica, clay, talc and mica. Metal and metal alloys typically include titanium, tungsten, aluminum, bismuth, nickel, molybdenum, iron, steel, lead, copper, brass, boron, zinc and tin, among others. Metal oxides typically include zinc oxide, iron oxide, aluminum oxide, titanium oxide and magnesium oxide. Metal stearates typically include zinc stearate, calcium stearate, barium stearate, lithium stearate and magnesium stearate. Particulate carbonaceous materials typically include graphite, carbon black, natural bitumen, cotton flock and cellulose.

The fillers are typically mixed or blended in a finely divided form with polymeric material, or are mixed with the monomers prior to polymerization to react and become part of the polymer. However, some of these fillers, such as graphite, have nanostructures that have not been fully utilized in the golf ball art. Up to now, graphite is typically delaminated into single-layer platelets with various aspect ratios for dispersion into a polymeric matrix for use as a layer(s) on the golf ball. Hence, there remains a need in the art for a golf ball having improved filled layers.

SUMMARY OF THE INVENTION

The present invention is directed to a golf ball having at least one layer that comprises fillers having nanostructures. The present invention is also directed to a golf ball having at least one layer that comprises fillers having altered nanostructures.

The present invention is also directed to a golf ball having at least one layer that comprises exfoliated graphite.

In accordance to one aspect of the invention, at least a layer in the golf ball contains nanosheets of exfoliated graphite dispersed in a polymeric matrix. Exfoliated graphite is graphite that has been intercalated preferably by an oxidation process, where the atoms or molecules have been inserted into the inter-planar spacing between the layered planes of carbons, and expanded. The intercalated graphite is expanded or exfoliated preferably by brief exposure to high heat to expand the thickness of the graphite. The expanded or exfoliated graphite is then mixed with monomers and polymerized in situ to form a polymer with a network of nanosheets of the exfoliated graphite dispersed therein. The exfoliated graphite advantageously retains its nanostructure during the polymerization process. The resulting golf ball layer comprising such polymer with nanosheets of exfoliated graphite exhibits superior tensile strength, low permeability to gas and increased impact strength.

In accordance to another aspect of the invention, the expanded or exfoliated graphite is compressed together into flexible thin sheets or foils. Such sheets can be made with or without a polymeric binder. Such flexible foils of compressed exfoliated graphite exhibit low gas permeability property. The present invention is also directed to a golf ball comprising a water vapor barrier layer, wherein the water vapor barrier layer comprises a foil of compressed exfoliated graphite layer.

DETAILED DESCRIPTION OF THE INVENTION

Figure 1:
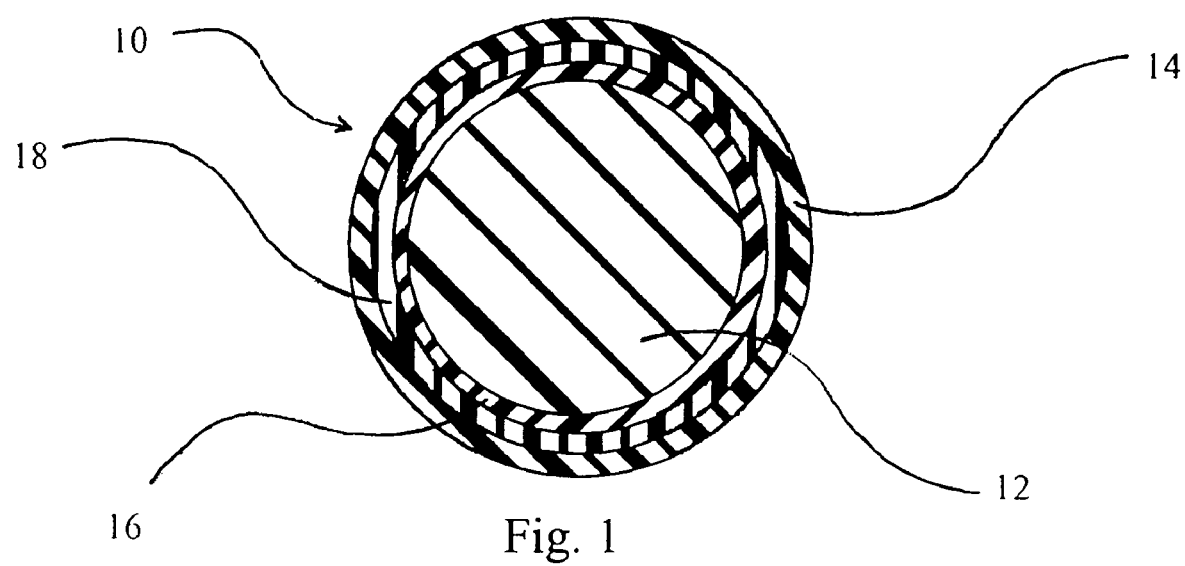
FIG. 1 is one embodiment of the golf ball of the present invention having a solid core and an inner, intermediate, and outer cover layer.

Referring to FIG. 1, a golf ball 10 of the present invention can include a core 12 and a cover comprising an outer cover 14 and at least two inner cover layers, such as inner cover layer 16 and intermediate cover layer 18. Preferably, the graphite nanosheets are used to form one or more inner cover layers, but the golf ball of the present invention may be formed with a variety of constructions.

Graphite consists of a plurality of layered planes of hexagonal arrays or networks of carbon atoms. The layered planes of hexagonally arranged carbon atoms are substantially flat and are oriented substantially parallel to one another. The carbon atoms on a single layered plane are covalently bonded together, and the layered planes are bonded by substantially weaker van der Waals forces. Graphite is also an anisotropic structure and exhibits many properties that are highly directional. Graphite also possesses a high degree of orientation. Graphite includes natural graphite, Kish graphite and synthetic graphite. Natural graphite is found in nature. Kish graphite is the excess carbon, which crystallizes in the course of smelting iron. Synthetic graphite is produced by pyrolysis or thermal decomposition of a carbonaceous gas at elevated temperatures above 2500° C.

Two axes or directions are commonly associated with graphite. The "c" axis is generally the direction perpendicular to the layered planes. The "a" axis is generally the direction parallel to the layered plane, or the direction perpendicular to the "c" direction. Since the size of the individual graphite solids is measured in micron ($10^{-6}$ meter), nanometer ($10^{-9}$ meter) or Angstrom ($10^{-10}$ meter), the terms nanostructure(s) and nanosheet(s) denote the structure of graphite in its unaltered, natural, intercalated, expanded, exfoliated or compressed after expanded form. The term nanosheet(s) further denotes layered planes of graphite.

Graphite fillers are available commercially in powder form from Asbury Graphite, Inc. in Asbury, N.J. and Poco Graphite Inc, in Decatur, Tex. in the United States, or from Shandong Qingdao Company outside the United States.

In accordance to a first preferred embodiment of the present invention and as described in detail below, graphite in its unaltered form is intercalated to insert atoms or molecules in the inter-planar spaces between the layered planes. The intercalated graphite is then expanded or exfoliated by sudden exposure to high heat to expand the inter-planar spacing between the layered planes. The exfoliated graphite is then mixed with suitable monomers and other additives prior to in situ polymerization to form nanosheets of graphite dispersed in a polymeric matrix. The polymeric matrix with graphite nanosheets dispersed therein may be formed into one or more layers of a golf ball, or it may be blended with other polymers to form one or more layers of a golf ball.

The weak inter-planar van der Waals bonding forces allow the layered planes to be intercalated. In other words, the weaker van der Waals force allows certain atoms or molecules to enter and remain within the inter-planar spaces between the layered planes. A preferred method to intercalate graphite is immersing the graphite in a solution containing an oxidizing agent. Suitable oxidizing agents include solutions containing nitric acid, potassium chlorate, chromic acid, potassium permanganate, potassium chromate, potassium dichromate, perchloric acid and the like, or mixtures, such as concentrated nitric acid and chlorate, chromic acid and phosphoric acid, sulfuric acid and nitric acid, or mixtures of a strong organic acid, e.g., trifluoroacetic acid, and a strong oxidizing agent soluble in the organic acid.

Preferably, the intercalating agent is a solution containing a mixture of X/Y, wherein X can be sulfuric acid or sulfuric acid and phosphoric acid and Y is an oxidizing agent, such as nitric acid, perchloric acid, chromic acid, potassium permanganate, sodium nitrate, hydrogen peroxide, iodic or periodic acids. More preferably, the intercalating agent is a solution comprising about 80% by volume of sulfuric acid and 20% by volume of nitric acid. Preferably, the graphite is immersed in the sulfuric and nitric acid solution for up to 24 hours, or more. The resulting material, also known as graphite intercalated compound, comprises layered planes of carbon and intercalate layers stacked on top of one another in a periodic fashion. Typically, one (1) to five (5) layers of carbon can be present between adjacent intercalate layers. The preferred quantity of intercalated solution is from about 10 parts to about 150 parts of solution to 100 parts of graphite, more preferably from about 50 parts to about 120 parts to 100 parts of graphite.

Alternatively, the intercalating process can be achieved by other chemical treatments. For example, the intercalating agents may include a halogen, such as bromine, or a metal halide such as ferric chloride, aluminum chloride, or the like. A halogen, particularly bromine, may be intercalated by contacting graphite with bromine vapors, or with a solution of bromine in sulfuric acid, or with bromine dissolved in a suitable organic solvent. Metal halides can be intercalated by contacting the graphite with a suitable metal halide solution. For example, ferric chloride can be intercalated by contacting graphite with an aqueous solution of ferric chloride, or with a mixture of ferric chloride and sulfuric acid.

Other suitable intercalating agents include, but are not limited to, chromyl chloride, sulfur trioxide, antimony trichloride, chromium(III)chloride, iodine chloride, chromium(IV)oxide, gold(III)chloride, indium chloride, platinum(IV)chloride, chromyl fluoride, tantalum(V)chloride, samarium chloride, zirconium(IV)chloride, uranium chloride, and yttrium chloride.

The intercalated graphite is then washed with water until excess intercalating agent is washed from the graphite, or if acid is used until the washed water's pH value is neutral. The graphite is then preferably heated to above the boiling point of the washed solution to evaporate the washed solution. Alternatively, to eliminate the post-intercalation washing step the amount of intercalated solution may be reduced to about 10 parts to about 50 parts per 100 parts of graphite as disclosed in U.S. Pat. No. 4,895,713. The '713 patent is incorporated herein by reference.

To expand or exfoliate the inter-planar spacing between the layered planes, the intercalated graphite is exposed to very high heat in a relatively short amount of time. Without being bound by any particular theory, the exfoliated mechanism is the decomposition of the trapped intercalating agent, such as sulfuric and nitric acids ($H_2SO_4+HNO_3$), between the highly oriented layered planes when exposed to heat.

Suitable exfoliated processes include heating the intercalated graphite for a few seconds at temperatures of at least greater than 500° C., more preferably greater than 700° C., and more typically 1000° C. or more. The treated graphite typically expands in the "c" direction about 100 to more than 300 times the pre-treatment thickness. In one preferred exfoliating process, the intercalated graphite is exposed to temperature of about 1050° C. for about 15 seconds to achieve a thickness in the "c" direction of about 300 times of that in the pre-exfoliated graphite. For natural graphite with original thickness of about 0.4 μm to 60 μm, the thickness of exfoliated graphite can be in the range of about 2 μm to about 20,000 μm.

The exfoliated graphite is a loose and porous form of graphite. It also has worm-like or vermicular appearance. The exfoliated graphite comprises parallel layers, which have collapsed and deformed irregularly forming pores of varying sizes on the layers. In accordance to a study entitled "Dispersion of Graphite Nanosheets in a Polymeric Matrix and the Conducting Property of the Nanocomposites" by G. H. Chen, D. J. Wu, W. G. Weng and W. L. Yan, published in the Polymer Engineering and Science, Vol. 41, No. 12 (December 2001), individual sheet or layer of graphite has a thickness in the range of about 100 nm to about 400 nm. The Chen et al study is hereby incorporated by reference herein in its entirety. The Chen et al study reports that exfoliated graphite comprises carbon layers and graphite nanosheets, which include thin parallel sheets with thickness of less than 5 nm, and that the gallery spacing between nanosheets of about 10 nm.

The exfoliated graphite is then mixed with a monomer and heated to the polymerization or vulcanization temperature to form a polymer with nanosheets of exfoliated graphite dispersed therein. The exfoliated graphite also reacts with the monomer to become a part of the structure of the polymer. It has also been shown that the nanosheets retained its structure in the polymer matrix, and that the monomer or polymer entered the gallery spacing between the nanosheets.

It has also been determined that the dispersion of nanosheets of exfoliated graphite in the polymeric matrix improves the tensile strength of the polymer. This improved tensile strength of the polymer/graphite composite improves its impact strength.

The polymeric matrix can be any polymeric composition that is compatible with carbon. Suitable polymeric compositions include thermosetting polymers and thermoplastic polymers. More particularly, suitable polymeric compositions include polyethylene, polypropylene, acrylic and methacrylic polymers such as polymethyl methacrylate, polystyrene, polyepoxides or any polymer comprising an epoxy moiety, phenol-formaldehydes, polyamides, polyesters, polyvinyl chlorides, polycarbonates, polyacetals, polytetrafluoroethylene, polyvinylidene fluoride, polyurethanes, copolymers and blends of same and the like.

Suitable polymeric compositions also include, but not limited to, one or more of partially or fully neutralized ionomers including those neutralized by a metal ion source wherein the metal ion is the salt of an organic acid, polyolefins including polyethylene, polypropylene, polybutylene and copolymers thereof including polyethylene acrylic acid or methacrylic acid copolymers, or a terpolymer of ethylene, a softening acrylate class ester such as methyl acrylate, n-butyl-acrylate or iso-butyl-acrylate, and a carboxylic acid such as acrylic acid or methacrylic acid (e.g., terpolymers including polyethylene-methacrylic acid-n or iso-butyl acrylate and polyethyleneacrylic acid-methyl acrylate, polyethylene ethyl or methyl acrylate, polyethylene vinyl acetate, polyethylene glycidyl alkyl acrylates). Suitable polymers also include metallocene catalyzed polyolefins, polyesters, polyamides, non-ionomeric thermoplastic elastomers, copolyether-esters, copolyether-amides, thermoplastic or thermosetting polyurethanes, polyureas, polyurethane ionomers, epoxies, polycarbonates, polybutadiene, polyisoprene, and blends thereof. Suitable polymeric materials also include those listed in U.S. Pat. Nos. 5,919,100, 6,187,864, 6,232,400, 6,245,862, 6,290,611, 6,353,058, 6,204,331 and 6,142,887 and in PCT publication nos. WO 00/23519 and WO 01/29129. Ionomers, ionomer blends, thermosetting or thermoplastic polyurethanes, metallocenes are also suitable materials.

Most preferably, the polymer matrix materials include natural rubber, stryene-butadiene rubber, stryene-propylene or ethylene-diene block copolymer rubber, polyisoprene, polybutadiene, copolymers comprising ethylene or propylene such as ethylene-propylene rubber (EPR) or ethylene-propylene diene monomer (EPDM) elastomer, copolymers of acrylonitrile and a diene comprising elastomer (such as butadiene), polychloroprene and any copolymer including chloroprene, butyl rubber, halogenated butyl rubber, polysulfide rubber, silicone comprising polymers Exfoliated graphite may also be bonded with organic char materials, such as coal tar pitches, asphalts, phenol-formaldehyde, urea-formaldehyde, polyvinylidene chloride, polyacrylonitrile, sugars, and saccharides, inorganic glass bonding agents, such as boric oxide, silica, phosphorous, pentoxide, germanium oxide, vanadium pentoxide, and inorganic salts, such as beryllium fluoride, sulfates, chlorides and carbonates.

Alternatively, hydrogen peroxide can be blended with the intercalating agent, preferably sulfuric acid, and agitated until graphite-hydrogensulfate compound is formed. The compound is then removed from the intercalating solution and washed. The graphite-hydrogensulfate compound is exfoliated as described above to form the exfoliated compound. This compound has properties that are similar to the exfoliated graphite. Advantageously, the process of producing graphite-hydrogensulfate compound releases less pollutants into the environment. This method is described in U.S. Pat. No. 4,091,083 and the disclosure of the '083 patent is incorporated herein by reference.

The nanosheets of exfoliated graphite may also have auxiliary materials bonded thereon or embedded therein to improve the strength and durability of the graphite, as disclosed in U.S. Pat. No. 4,961,988. The disclosure of the '988 patent is incorporated herein by reference. Auxiliary materials preferably include soft linear or membranous substance, including organic synthetic film, glass fibers, natural or synthetic fibers and carbon fibers. Preferably, the auxiliary materials have a thickness of less than 0.2 mm and more preferably between about 0.02 to 0.06 mm. The auxiliary materials may be coated with an adhesive to promote bonding with the exfoliated graphite. The auxiliary materials preferably are passed through a bath containing the adhesive or a solution containing adhesive and dried, prior to being bonded with exfoliated graphite. The amount of auxiliary materials is preferably less than 10% by weight of the graphite/auxiliary composite.

Additionally, the nanosheets/polymeric matrix composite may be grounded or crushed and then mixed or blended with a second encasing polymeric material to produce a layer on the golf ball. Suitable polymeric materials for the polymeric matrix discussed above are also suitable to be second encasing material. Preferably, the polymeric matrix material is methyl methacrylate and the second encasing polymeric material is a polyurethane or a natural or synthetic rubber, preferably polybutadiene.

A golf ball in accordance to the present invention includes at least one layer that comprises nanosheets of the exfoliated graphite dispersed in a polymeric matrix as described above. This layer may be the inner or outer cover, an inner or outer core, or an intermediate layer. Since the structure of the nanosheets presents a tortuous path for vapors and gases to pass through, the intermediate layer may be a water vapor barrier layer. Generally, water vapor permeating through the cover degrades the properties of polybutadiene core. More specifically, water vapor encroachment reduces the coefficient of restitution of the core. The need for water vapor barrier layer and methods for minimizing the encroachment of water vapor into the core of the golf ball are fully discussed in co-pending patent application entitled "Golf Ball With Vapor Barrier Layer And Method Of Making Same" filed on Oct. 9, 2001 bearing Ser. No. 09/973,342. This co-pending application is hereby incorporated by reference in its entirety.

In accordance to a second embodiment of the present invention, the expanded or exfoliated graphite is compressed to form a very thin foil or sheets, with or without polymeric binder, having a thickness as thin as about 0.1 mil and as thick as 600 mils. Such compressed exfoliated graphite foils or sheets are flexible and possess high tensile strength. Compression of exfoliated graphite is disclosed in U.S. Pat. No. 3,404,061, and the disclosure of the '061 patent is incorporated herein by reference in its entirety. Without being bound to any particular theory, it is believed that the formation of flexible foils from exfoliated graphite is possible due to the superior mechanical interlocking between the layered planes of graphite when the thickness of the graphite is being increased quickly to several hundreds times its pre-exfoliated thickness. Advantageously, such foils or sheets have high resistance to vapor or gas transmission, due to the nature of the overlapping layered planes being compressed together, as taught in U.S. Pat. No. 4,888,242. It has been reported that graphite foils are impermeable to helium at $10^{-5}$ mm of mercury, which essentially is a vacuum. The water vapor transmission rate of compressed exfoliated graphite is negligible or essentially zero. Hence, in accordance to the present invention compressed foils of exfoliated graphite are used as the water vapor barrier in a golf ball. Preferably, the compressed exfoliated graphite foil is positioned between the core and the cover. On the other hand, it can be located anywhere on the golf ball.

It is conventional to compress the exfoliated graphite in stages. In the first or early stages, the exfoliated graphite may be compressed to thickness of about 0.1 inch to 1 inch. This relatively thick graphite solid is then compressed between rolls or by hydraulic presses to a predetermined thickness. Compressed graphite foils are commercially available under the trade name GRAFOIL® with thickness in the range of 3 mils to 600 mils from Graftech, Inc, located in Lakewood, Ohio. Preferably, the compressed graphite foil is free of any binder.

Optionally, a polymeric binder can be mixed with the exfoliated graphite before compression. Preferably, when the thickness of the exfoliated graphite is less than 80 times its pre-treatment thickness, a binder should be used. Suitable polymeric binders include polyethylene, phenol-formaldehyde resin, epoxy resins, polyurethane, phenolic resin and the like. The polymeric binder can make up to 60% by weight of the foil. More preferably, the polymeric binder makes up less than 35% by weight to optimize the strength of the foil. Also, the polymeric binder is preferably a thermosetting material, because it is curable by pressure and remains in the cured state upon removal of the applied pressure, so as to maintain the graphite particles under compression. On the other hand, thermoplastic materials are suitable when further working or molding is required.

Other additives can be mixed or blended with the exfoliated graphite before compression. Suitable additives include the auxiliary materials discussed above, metal powders, clay, polymers and the like. Preferably, metal powders with high specific gravity, such as tungsten, can be blended with the exfoliated graphite to create a thin dense layer. As used herein, high specific gravity denotes a specific gravity greater than about 2.0. More preferably, the high specific gravity is more than about 5.0 or about 10.0. The thin dense layer can be used to alter the moment of inertia of the golf ball or its initial spin rate, depending on the location of the thin dense layer relative to a centroid radius of the ball. When more of the ball's mass or weight is reallocated to the volume of the ball from the center to the centroid radius, the moment of inertia is decreased, thereby producing a high spin ball. When more of the ball's mass or weight is reallocated to the volume between the centroid radius and the outer cover, the moment of inertia is increased thereby producing a low spin ball. For a 1.62-ounce golf ball with a 1.68-inch radius, the centroid radius is about 0.65 inch from the center of the ball. The determination of the centroid radius and method for altering the moment of inertia based on the centroid radius is fully discussed in co-pending patent application bearing Ser. No. 09/815,753 entitled "Golf Ball And A Method For Controlling The Spin Rate Of Same" and filed on Mar. 31, 2001. This co-pending application is incorporated herein by reference in its entirety.

Advantageously, the compressed exfoliated graphite foil when impregnated with a high specific gravity additive, such as tungsten powder, can be used as a thin dense layer to control the moment of inertia of the golf ball, as well as a water vapor barrier layer to protect the ball against water vapor encroachment.

The compressed graphite sheet or foil can be cut and shaped to conform to circular or curved surfaces. Preferably, the compressed graphite sheet are shaped and dimensioned as half-shells or as figure-8s (similar to the pattern of a baseball) for assembling on to the outer core of the golf ball to minimize the water vapor encroachment into the core of the golf ball. The compressed exfoliated graphite may also be coated with adhesive to facilitate its placement on golf ball cores during assembly.

While various descriptions of the present invention are described above, it is understood that the various features of the present invention can be used singly or in combination thereof. For example, other materials with a high degree of orientation and anisotropy can be used instead of graphite. Such materials include alloys of graphite, such as pyrolytic graphite alloy, boron nitride and alloys thereof. Therefore, this invention is not to be limited to the specifically preferred embodiments depicted therein.

What is claimed is:

1. A golf ball comprising a core, a cover and at least one intermediate layer therebetween, wherein the intermediate layer is comprised of exfoliated graphite nanostructures dispersed in a polymeric matrix, wherein the graphite nanostructures comprise graphite nanosheets including thin parallel sheets having a thickness of less than 5 nanometers.

2. The golf ball of claim 1, wherein the graphite is exfoliated by an exposure to a temperature higher than 700° C.

3. The golf ball of claim 1, wherein the graphite is intercalated by immersion in a solution containing an oxidizing agent.

4. The golf ball of claim 3, wherein the oxidizing agent is selected from a group consisting of nitric acid, potassium chlorate, chromic acid, potassium permanganate, potassium chromate, potassium dichromate, perchloric acid, and mixtures thereof.

5. The golf ball of claim 3, wherein said solution comprises sulfuric acid, and the oxidizing agent is selected from a group consisting of nitric acid, perchloric acid, chromric acid, potassium permanganate, sodium nitrate, hydrogen peroxide, iodic and periodic acids.

6. The golf ball of claim 3, wherein the amount of solution is about 10 to 150 parts to 100 parts of graphite.

7. The golf ball of claim 1, wherein the graphite is intercalated by exposure to a halogen.

8. The golf ball of claim 7, wherein the halogen is in solution with sulfuric acid.

9. The golf ball of claim 1, wherein the graphite is intercalated by exposure to a metal halide.

10. The golf ball of claim 9, wherein the metal halide is in solution with sulfuric acid.

11. The golf ball of claim 1, wherein the nanostructure is compressed into foil.

12. The golf ball of claim 1, wherein the polymeric matrix is selected from the group consisting of natural rubber, stryene-butadiene rubber, stryene-propylene or ethylene-diene block copolymer rubber, polyisoprene, polybutadiene, copolymers comprising ethylene or propylene, as ethylene-propylene rubber (EPR), ethylene-propylene diene monomer (EPDM) elastomer, copolymers of acrylonitrile, diene elastomers, polychloroprene, chloroprene copolymers, butyl rubber, halogenated butyl rubber, polysulfide rubber, and silicone polymers.

13. The golf ball of claim 1, wherein the polymeric matrix is selected from a group consisting of polyethylene, polypropylene, acrylic polymers, methacrylic polymers, polymethyl methacrylate, polystyrene, polyepoxides, polymers comprising an epoxy moiety, phenol-formaldehydes, polyamides, polyesters, polyvinyl chlorides, polycarbonates, polyacetals, polytetrafluoroethylene, polyvinylidene fluoride, polyurethanes, copolymers of acrylic, copolymers of methacrylic, blends of acrylic polymers, blends of methacrylic polymers, partially neutralized ionomers, fully neutralized ionomers, polybutylene, copolymers comprising one or more olefins, polyethylene acrylic acid copolymers, polyethylene methacrylic acid copolymers, terpolymers of ethylene, a softening acrylate class ester, and a carboxylic acid, polyethylene ethyl acrylate, polyethylene methyl acrylate, polyethylene vinyl acetate, polyethylene glycidyl alkyl acrylates, metallocene catalyzed polyolefins, polyesters, polyamides, nonionomeric thermoplastic elastomers, copolyether-esters, copolyether-amides, thermoplastic polyurethanes, thermosetting polyurethanes, polyureas, polyurethane ionomers, epoxies, polycarbonates, polybutadiene, polyisoprene, and blends thereof.

14. The golf ball of claim 1, wherein the intermediate layer is a water vapor barrier layer.

15. The golf ball of claim 1, wherein the gallery spacing between nanosheets is about 10 nanometers.

16. A golf ball comprising a core, a cover and a water vapor barrier layer, wherein said water vapor barrier layer comprises graphite foil sheets, and wherein the graphite foil is compressed exfoliated graphite and has a thickness of about 0.1 to 600 mils.

* * * * *